United States Patent [19]

Potember et al.

[11] Patent Number: 4,684,598
[45] Date of Patent: Aug. 4, 1987

[54] ENHANCED OPTICALLY SENSITIVE MEDIUM USING ORGANIC CHARGE TRANSFER MATERIALS TO PROVIDE REPRODUCIBLE THERMAL/OPTICAL ERASURE

[75] Inventors: Richard S. Potember, Catonsville; Theodore O. Poehler, Baltimore, both of Md.

[73] Assignee: The Johns Hopkins University, Baltimore, Md.

[21] Appl. No.: 674,129

[22] Filed: Nov. 23, 1984

[51] Int. Cl.$^4$ .................................................. G03C 5/00
[52] U.S. Cl. ...................................... 430/269; 430/273; 430/343; 430/346; 430/350; 430/495; 430/900; 430/902; 346/135.1; 346/137; 365/110; 252/500
[58] Field of Search ................ 430/269, 270, 273, 495, 430/900, 902, 346, 343, 350, 945; 346/135.1, 137; 365/110, 119; 252/500

[56] References Cited

U.S. PATENT DOCUMENTS

| | | | |
|---|---|---|---|
| 4,359,411 | 11/1982 | Kim et al. | 252/500 |
| 4,371,883 | 2/1983 | Potember et al. | 357/8 |
| 4,374,048 | 2/1983 | Kim et al. | 252/500 |
| 4,425,570 | 1/1984 | Bell et al. | 346/135.1 |

FOREIGN PATENT DOCUMENTS 61-63496  4/1986  Japan .
61-78689  4/1986  Japan .

OTHER PUBLICATIONS

Kaufman, "Pi-Donor Intercalate Polymers: Synthesis, Charge-Transfer Interactions and Applications, *IBM J. Res. Develop.*, vol. 25, No. 4, Jul. 1981, pp. 303-312.

Primary Examiner—John E. Kittle
Assistant Examiner—José G. Dees
Attorney, Agent, or Firm—Robert E. Archibald; Howard W. Califano; Mary Louise Beall

[57] ABSTRACT

An enhanced optically sensitive medium is disclosed which uses an organic charge transfer complex as the switching material. The organic charge transfer complex includes at least one moiety in an oxidized state. An enhancement mechanism is taught which provides a secondary source of neutral molecules of said at least one constituent moiety in the neutral or altered oxidation state. For example, with CuTCNQ used as the switching material, the erasing characteristics can be improved by using a covering dispersion having a matrix polymer interspersed with neutral molecules of TCNQ°.

37 Claims, 8 Drawing Figures

/ = NEUTRAL TCNQ (24)
o/ = METAL-TCNQ (22)
≈ = COMPLEXING AGENT (25)

/ = NEUTRAL TCNQ (24)
∘/ = METAL-TCNQ (22)
⌇ = COMPLEXING AGENT (25)

ENHANCED OPTICALLY SENSITIVE MEDIUM USING ORGANIC CHARGE TRANSFER MATERIALS TO PROVIDE REPRODUCIBLE THERMAL/OPTICAL ERASURE

STATEMENT OF GOVERNMENT INTEREST

The Government has rights in this invention pursuant to Contract No. N00024-83-C-5301 awarded by the Department of the Navy.

BACKGROUND AND/OR ENVIRONMENT OF THE INVENTION

1. Field of the Invention

The present invention pertains generally to the use of organic charge transfer materials to produce an optically sensitive medium; and, more particularly, various enhancement mechanisms for providing improved thermal/optical erasure characteristics.

2. Description of the Contemporary and/or Prior Art

With the advent of the information revolution, recent research activities have focused on developing optical storage medium. Currently, optical memory devices rely on photochemical hole burning (PHB) in which a laser pits the material in an effort to store data. An article entitled "Laser Marking of a Thin Organic Film" by J. J. Wrobel et al, *Applied Physics Letter* 40, (11), June 1, 1982, describes such a technique using a laser beam to burn holes in a thin organic film. Similarly, optical writing on blue, sputtered iridium oxide films is reported by Mabosch et al in *Applied Physics Letter* 41, July 1, 1982. This technique uses an optical writing mechanism to thermally induce dehydration at temperatures below the melting point of the optical medium. A patent issued to Ovshinsky (U.S. Pat. No. 3,983,542) discloses a material which undergoes a physical change from an amorphous to a crystalline state when exposed to a light beam. An article entitled "Light-induced Phenomena in Dye-polymer Systems" by V. Novotny et al, *The Journal of Applied Physics* 50 (3), March 1979, describes an optical marking process based on diffusion in a dye-polymer system.

The prior art optical storage systems generally have one overriding disadvantage—prior art optical media is not erasable. As a result, optical storage technology has found little application in computer technology, which requires both read, write and erase functions.

The following U.S. patent and U.S. patent application filed by R. S. Potember, T. O. Poehler and D. O. Cowan, disclose a class of organic charge transfer salts, such as CuTCNQ, which exhibits stable and reproducible switching between an equilibrium, or first state, and a second state, in the presence of an applied electrical field: (1) "Current Controlled Bistable Electrical Organic Thin Film Switching Device (TCNQ)", issued Dec. 1, 1983, U.S. Pat. No. 4,371,883; and, (2) "Method of Fabricating a Current Control Bistable Electrical Organic Thin Film Switching Device (TCNQ)", filed June 7, 1982, Ser. No. 385,523, U.S. Pat. No. 4,507,627. The organic charge transfer salts will undergo a reversible electrochemical topotactic redox reaction in the presence of an applied electric field, thereby switching from a first state to a second state. A detectably different impedance occurs between the equilibrium, or first state, and the switched and second state. In specific, an electrical field is applied across a thin film of CuTCNQ, or an equivalent organic charge transfer salt. When the applied electrical field exceeds a threshold value, the impedance across the thin organic film will drop from a relatively high impedance to a relatively low impedance.

Two papers written by R. S. Potember et al report that when the organic film is electrically switched, the second state has different optical properties from the equilibrium or first state; (1) "The Vibrational and X-ray Photoelectron Spectra of Semiconducting Copper-TCNQ Films" *Chemica Scripta,* Vol.17, 219–221 (1981); and, (2) "Electrical Switching and Memory Phenomena in Semiconducting Organic Thin Films" *American Chemical Society Symposium Series* No. 184 (1982). These articles describe infrared spectroscopic means and reference well-known Raman spectroscopic techniques (S. Matsuzaki et al, "Raman Spectra of Conducting TCNQ Salts" *Solid State Communications,* Vol. 33, pp. 403–405, 1980) for determining if the CuTCNQ film, switched by an AC or DC electric field is in the first or second state. Follow-up work reported by E. I. Kamitsos et al used Raman spectroscopic techniques to verify the electrochemical charge transfer equation described in the above-referenced articles which cause the CuTCNQ salt to switch from the first to second state: "Raman Study of the Mechanism of Electrical Switching in CuTCNQ films" *Solid State Communications,* Vol. 42, No. 8, pp. 561–565 (1982). The above articles point out that spectroscopic means can be used to discern whether an area of CuTCNQ switched by an applied electrical field is in the first or second state.

Patent application Ser. No. 464,771 filed 2/7/83 by R. S. Potember, T. O. Poehler and R. C. Benson and entitled "Optical Storage and Switching Devices Using Organic Charge Transfer Salts" now U.S. Pat. No. 4,574,366 teaches that in the presence of optical energy the organic charge transfer salt will undergo a redox reaction and switch from a first to a second state; each state having a detectably different optical spectrum. Spectroscopic means can optically determine if a particular spot on the storage medium is in the first (neutral) or second (switched) state. The application further teaches that thermal energy can reverse the electrochemical reaction and return the material to the first (neutral) state. The above application thus teaches an operable optically sensitive medium which can be switched by an optical beam and erased either in sections or on a bit by bit basis.

A paper by R. S. Potember, T. O. Poehler and R. C. Benson entitled "Optical Switching in Semiconductor Organic Thin Films" *Applied Physics Letters,* Vol. 41 (6), Sept. 15, 1982, and a paper by E. I. Kamitos and W. M. Risen, Jr. entitled "Optically Induced Transformations of Metal TCNQ Materials" *Solid State Communications,* Vol. 45, No. 2, 1983, discuss the optical switching characteristics of organic charge transfer salts. A U.S. patent application by R. S. Potember and T. O. Poehler entitled "Multistate Optical Switching and Memory Using an Amphoteric Organic Charge Transfer Material" (Ser. No. 603,717, filed 4/25/84) teaches that organic charge transfer materials can be switched into a plurality of states—making multiple bit storage possible at each spot on an optical storage medium.

Although the above references teach the use of organic charge transfer materials in an optically sensitive medium, there has been the need to enhance reproducibility of the erasure process. For an erasable optical storage disc to meet the needs of the current data processing industry, $10^2$–$10^6$ cycles of bit by bit erasure are desirable.

SUMMARY OF THE INVENTION

Applicants have discovered that the erasure characteristics of the organic charge transfer switching materials can be improved by the present enhancement mechanism. The invented enhancement mechanism principally provides a secondary source of molecules of a constituent moiety in the neutral or in a changed or altered oxidation state. Placing such constituent moiety molecules in close proximity to the organic charge transfer material in the switched state enhances thermal recombination of the switched material. For example, if an organic charge transfer salt such as CuTCNQ is the switching material, the present invention would provide a secondary source of neutral acceptor TCNQ° molecules. The present invention also teaches the use of a complexing or chelating agent for increasing the compatibility of various constituent moieties in their neutral or altered oxidation states and enhances thermal/optical recombination. For example, the complexing agent helps solubilize the ion-radical salt of CuTCNQ to increase its compatibility with the additional constituent neutral acceptor molecules TCNQ°.

In a first embodiment of the invention, a thin film of the organic charge transfer switching material, deposited on a supporting substrate, is covered with a polymer dispersion containing neutral moiety molecules (e.g., neutral acceptor molecules) in an optional complexing agent. The neutral acceptor molecules and complexing agent are interspersed within a polymer matrix forming a solid transparent covering layer. At the interface between the polymer dispersion and the film of organic charge transfer material, enhanced thermal erasure is observed with the application of a beam of light used to generate thermal energy.

In a second embodiment of the invented enhancement mechanism, a polymer dispersion is interspersed with both the organic charge transfer switching material (e.g., microcrystals of an organic charge transfer salt, CuTCNQ) and the enhancement material (e.g., neutral constituent acceptor molecules, TCNQ°). Optionally, the polymer dispersion can also be interspersed with a complexing agent to enhance the compatibility between moieties in the switched state. A thin film of the polymer dispersion can be coated onto a supporting base or the polymer dispersion can be molded into the appropriate form (i.e., disc, records, etc.) with the polymer dispersion acting as a self-supporting base material.

Various applications of the enhancement mechanism, as taught by the present invention, can improve the erasure characteristics of the switching material. Various organic charge transfer materials, including both bistate and multistate amphoteric charge transfer materials can be used. Molecules of a moiety with a neutral or altered oxidation state can be donor atoms, and/or neutral acceptor molecules, if a bistate switching material is used, or one or more neutral, reduced or oxidized constituent moieties of an amphoteric compound if a multistate switching material is used.

Accordingly, it is one object of the present invention to provide an enhancement mechanism which improves the erasure characteristics of organic charge transfer switching materials. The enhancement mechanism provides a secondary source of molecules of at least one moiety of the switching material in a neutral or altered oxidation state thereby enhancing thermal recombination.

A second object of the present invention is the use of a complexing or chelating agent to increase the compatibility of the various constituent moieties in the switched state (for example, the complexing agent helps to solubilize the ion-radical salt to increase its compatibility with neutral acceptor moiety molecules).

A third objective of the present invention is the use of a polymer matrix as a cover layer to coat the thin film of the organic charge transfer material. The cover layer is a polymer matrix interspersed with the enhancing material (for example, neutral molecules of the acceptor moiety) and interspersed with an optional complexing agent.

A fourth object of the present invention is the use of a polymeric dispersion. The polymeric dispersion is a polymer matrix interspersed with microcrystals (or powdered form) of the organic charge transfer switching material and interspersed with molecules or atoms of a constituent moiety in a neutral or other altered oxidation state and with an optional complexing agent (For example, if the organic switching material is CuTCNQ, the enhancement material would be neutral acceptor molecules, TCNQ°).

A fifth object of the present invention is the use of polymeric encapsulation to protect the organic charge transfer switching material and to reduce migration or sublimation of constituent moieties (for example, donor and acceptor species) during the switching processes.

A sixth object of the present invention is the use of a free standing switching polymeric dispersion which simplifies construction and reduces the cost of fabricating the optical switching medium.

The above-mentioned objectives, as well as other objectives of the present invention, will become readily apparent after reading the ensuing description of several non-limiting illustrative embodiments and viewing the accompanying drawings.

BRIEF DESCRIPTION OF THE DRAWINGS

FIG. 1 is a graph of the Raman spectral bands for bistate CuTCNQ.

FIG. 6 shows the improved erasure characteristics of the present invention.

DETAILED DESCRIPTION OF THE PREFERRED EMBODIMENT

To understand the enhancement mechanism disclosed herein it is necessary to understand some of the principles of optical switching as described in the copending U.S. application entitled "Optical Storage and Switching Devices using Optical Charge Transfer Salts" (Ser. No. 464,771) which is incorporated herein by reference. The redox reaction which occurs when a bistable organic charge transfer salt, such as CuTCNQ, is illuminated with a beam, having sufficient optical field strength, and switched from a first to a second state, is shown below:

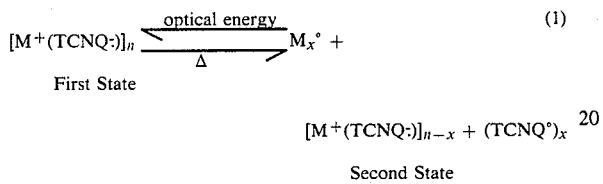

First State $$[M^+(TCNQ\bar{\cdot})]_{n-x} + (TCNQ^\circ)_x \quad (1)$$

Second State

It is believed that switching occurs because the optical beam (i.e., an electromagnetic field at optical frequencies) causes the bond between the organic electron acceptor (in this case TCNQ) and the donor (represented by M) to break, allowing a charge to transfer from the donor to the organic electron acceptor. The foregoing Equation (1) clearly shows a change in charge distribution as the organic salt switches from a first to a second state. In the first, or base state, the organic electron acceptor moiety is found almost exclusively in the reduced form (TCNQ). However, in the second, or switched state, the organic electron acceptor moiety is found in both its reduced (TCNQ) and neutral (TCNQ) forms.

Figure 1A:
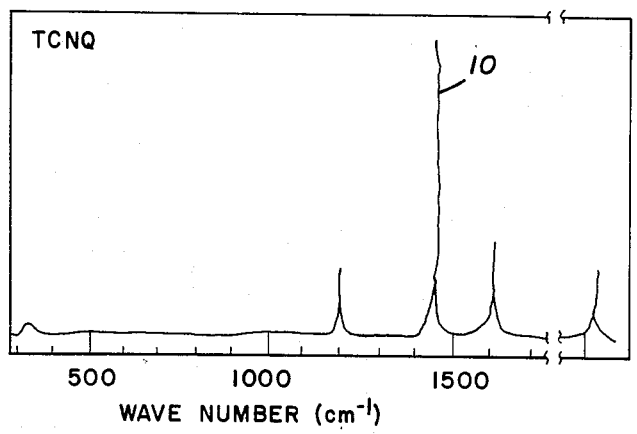
FIG. 1a shows the spectral bands for neutral TCNQ.
Figure 1B:
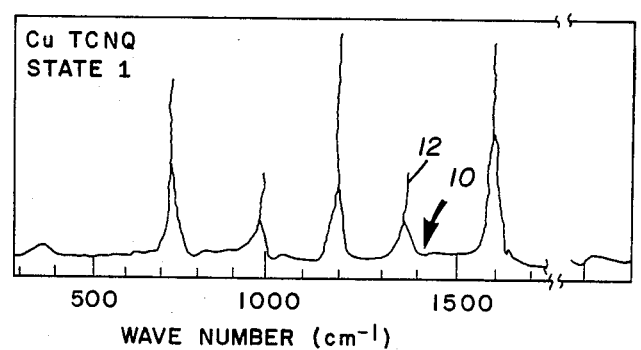
FIG. 1b shows the spectral bands for CuTCNQ in the unswitched state.
Figure 1C:
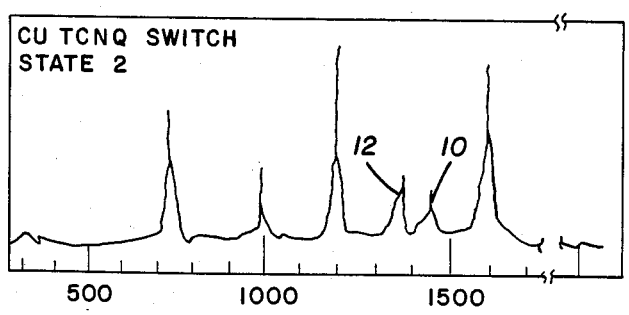
FIG. 1c shows the spectral bands for CuTCNQ in a second or switched state.

It will be noted from Equation (1) that each state is associated with a unique set of redox species. In the first state the acceptor moiety is found almost exclusively in the reduced form (e.g., only the TCNQ species is present); whereas, in the switched, or second state, the acceptor moiety exists in both the reduced and neutral form (e.g., TCNQ and TCNQ° redox species are present). Visual, spectroscopic, fluorescent and/or other optical means can be used to determine whether the bistate charge transfer salt is in the first or second state by identifying optical characteristics associated with each redox species. FIG. 1 shows the Raman spectral bands for the organic charge transfer salt CuTCNQ: FIG. 1a shows the spectral bands for neutral TCNQ (e.g., TCNQ°)—note the Raman band (10) at 1451 cm$^{-1}$; FIG. 1b shows the spectral bands for CuTCNQ in the first (unswitched) state where essentially all the organic electron acceptor moiety is in a reduced form (e.g., only the TCNQ redox species is present)—note the Raman band (12) at 1375 cm$^{-1}$ associated with the TCNQ species; FIG. 1c shows the spectral band for CuTCNQ in the second, or switched state, where the organic electron acceptor moiety is in both the reduced and neutral oxidation states (e.g., both the TCNQ and TCNQ° species are present)—note the apperance of Raman bands at 1375 cm$^{-1}$ (10) and 1451 cm$^{-1}$ (12). The Raman spectral bands at are fundamental absorption modes which are sensitive to the oxidation state of the organic electron acceptor moiety, thereby uniquely identifying the redox species present (i.e., in our example, determining if the TCNQ or TCNQ° redox species are present). When CuTCNQ is used as the organic charge transfer salt one need only analyze the 1451 cm$^{-1}$ spectral band (10) to determine if the organic salt is in the first or second state. If the CuTCNQ organic charge transfer salt is in the first state, the spectral intensity is low at 1451 cm$^{-1}$; if the organic charge transfer salt is in the second state, the spectral intensity is high at 1451 cm$^{-1}$ (10).

A number of organic charge transfer salts will switch from the first to second states, as above-described, when illuminated by an optical beam. Various TCNQ derivatives, when complexed with a metal donor, will form an organic charge transfer salt capable of optical switching. Examples of these TCNQ derivatives are shown in the following table:

| | |
|---|---|
| TCNQ(OMe) | TCNQ IMe |
| TCNQ(OMe)$_2$ | TCNQI |
| TCNQ(OMe)(OEt) | TCNQ(OMe)(OCH$_3$)$_2$ |
| TCNQ(OMe)(O—i-Pr) | (TCNQ(CN)$_2$ |
| TCNQ(OMe)(O—i-Bu) | (TCNQ(Me) |
| TCNQ(O—i-C$_2$H$_5$) | TCNQ(Et) |
| TCNQ(OEt)(SMe) | TCNQ(i-Pr) |
| TCNQ Cl | TCNQ(i-Pr)$_2$ |
| TCNQ Br | TCNQ(i-Pr) |
| TCNQ ClMe | TCNQ(i-Pr)$_2$ |
| TCNQ Br Me | |

Further, if an organic electron acceptor containing at least one cyanomethylene functional group is complexed with a donor moiety to form an organic salt, the organic salt will have memory and switching capabilities. Also, if an organic electron acceptor containing at least one quinoline unit is complexed with a donor moiety to form an organic salt, that organic salt will also have memory and switch capabilities. In specific, if an organic salt is formed from the following organic electron acceptors, the organic salt will be capable of optical memory and/or switching: tetracyanoquinodimethane (TCNQ), tetracyanonapthoquinodimethane (TNAP), tetracyanoethylene (TCNE), and 2, 3 dichloro-5,6 dicyano-1, 4 benzoquinone (DDQ), hexacyanobutalene (HCBD), and 11, 11, 12, 12-tetracyano-1.4 naphthoquinodimethane (benzo TCNQ), and 2,5-bis (dicyanomethylene)-2, 5-dihydrothiophene, and 2,5-bis (dicyanomethylene)-2, 5-selenophene, and thiophene-(T)-TCNQ, and (selenophene-(Se)-TCNQ) and tetracyano-quinoquina-zolinoquinazoline (TCQQ) and hexacyanotrimethylene cyclopropane (HMCTMCP) and 2,4-bis (dicyanomethylene)-1,3-dithietan (BDDT), and any of the TCNQ derivatives shown in the above table.

If the following metals are complexed with the above-referenced organic electron acceptor to form an organic salt, the organic salt will switch optically: copper, silver, lead, nickel, lithium, sodium, potassium, barium, chrome, molybdenum, tungsten, cobalt, iron, antimony, cesium and magnesium. In addition, the following organic substances can also act as donors, and if complexed with an organic electron acceptor to form an organic salt, the organic salt will be capable of optical memory and/or switching: tetrathioethylenes, dithiodinaminoethylenes, dithiodiselenoethylenes, tetraminoethylenes, azenes, aromatic hydrocyclics. It is to be understood that other organic transfer salts formed with organic electron acceptors having either cyanomethylene functional groups or quinoline units and other organic salts having similar characteristics, may be found which switch from the above-referenced first state to second state in the presence optical radiation.

Referring again to Equation (1), it can be seen that the electrochemical reaction is thermally erasable. Applying heat energy to an area of the organic charge transfer salt causes neutral molecules of the donor and electron acceptor found in the switched state to combine chemically and return to the first state. The reversible reaction, which is a thermally activated process, returns the material to its lower energy state. The applied heat can be generated by electrical or optical/thermal means. In a preferred embodiment the thermal energy is generated by a laser. It was found that a $CO_2$ laser, with an intensity below the switching threshold, can be focused on a location for a period of time sufficient to generate enough thermal energy to transfer that location to the first or neutral state.

The present invention is directed to a means for enhancing the erasure characteristics of the optically sensitive organic charge transfer medium. This invention produces an optical sensitive medium that can be repeatedly switched and erased. The enhancement mechanism provides a secondary source of neutral molecules of the electron acceptor and/or donor constituents of the organic charge transfer salt, thereby improving the speed and reproducibility of erasure. Two generalized embodiments of this invention utilize this enhancement mechanism.

MULTIPLE LAYER ENHANCEMENT EMBODIMENT

Figure 2:
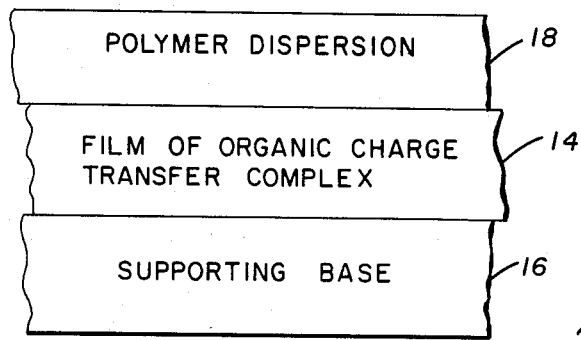
FIG. 2 is a generalized schematic of the multiple layer enhancement embodiment as taught by the present invention.

The multiple layer embodiment (shown in FIG. 2) involves fabricating a thin film 14 of the organic charge transfer salt onto supporting substrate (16) and then covering or coating this film with a polymer dispersion (18) containing additional neutral acceptor molecules in an optional complexing agent. Techniques for complexing the donor and acceptor moiety to form the organic salt, and techniques for forming the film, have been described in the art (see generally, the following Potember et al applications "Optical Storage and Switching Devices using Organic Charge Transfer Salts", Ser. No. 464,771, U.S. Pat. No. 4,574,366 and, "Method of Fabricating a Current Controlled Bistable Electrical Organic Thin Film Switching Device" Ser. No. 385,523, U.S. Pat. No. 4,507,672, both incorporated herein and by reference). Various additional techniques exist for sputtering, evaporating, or coating a film on a substrate which are known in the chemical art.

The thin covering layer, containing the enhancement mechanism, is produced by first mixing neutral acceptor molecules (the same type of acceptor molecules used to complex the particular organic salt) in a thermally stable polymer matrix to form a dispersion. The dispersion is then coated onto the film of organic salt to form a thin covering layer. The covering layer forms a relatively transparent polymer matrix interspersed with neutral molecules of the acceptor compound. At the interface between the polymer dispersion and the film of organic charge transfer material, enhanced thermal erasure is observed with the application of a beam of light generating thermal energy. This enhanced erasure occurs because excess neutral acceptor molecules, such as $TCNQ°$, in close proximity to the neutral donor ions can recombined readily to form the original charge transfer complex.

The erasure characteristics of the optically sensitive medium can be further enhanced if a complexing or chelating agent is also interspersed in the covering layer. To prepare this version of the covering layer 18, neutral acceptor molecules are mixed with a complexing or chelating agent and with a thermally stable polymer matrix to form a dispersion. This dispersion is then coated on the film 14 of organic charge transfer complex. The effect of the complexing agent is to increase the compatibility of the neutral acceptor molecules interspersed in the polymer matrix with the donor atoms found in switched portions of the organic charge transfer film.

Other versions of the covering layer 18 are also envisioned. Instead of interspersing neutral acceptor molecules in the dispersion, neutral donor atoms or molecules can be interspersed in the dispersion. Alternatively, the dispersion can be interspersed or mixed with neutral molecules of both the donor and acceptor moieties. Furthermore, the polymer matrix should be capable of passing optical energy through the covering the covering layer 18 to the charge transfer film 14 where switching occurs. Applicants prefer to use a transparent thermally stable polymer matrix.

The process of coating the organic charge transfer film with the covering layer 18, can involve spin casting, brushing, ultraviolet curing spraying or dry coating. Alternatively, the dispersion can be molded (by injection molding or other techniques) into a thin layer. This thin layer is then pressed onto the organic charge transfer film 14 where it bonds to form a secured covering layer. Further, to aid in the coating process, the dispersion also can contain a solvent. After the dispersion is coated onto the organic charge transfer film, the solvent is evaporated to form a solid covering layer.

Again it will be noted that the covering layer 18 performs the following functions: (1) excess neutral acceptor molecules interspersed, or mixed, in the polymer matrix provide a secondary source of molecules to combine with the donor atoms or molecules during the erasure step; (2) the complexing agent enhances compatibility between neutral acceptor molecules interspersed into the dispersions and donor atoms or molecules found in the switched portions of the organic charge transfer film; and, (3) the polymer overcoating also acts to protect the organic charge transfer film and to reduce migration or sublimation of donor or acceptor species during the switching process.

One example of the multiple layer enhancement embodiment is given by way of explanation and is not meant to limit this invention. Approximately 40 mg of neutral TCNQ (the neutral acceptor molecule) is added to a slurry containing 500 mg of polymethylmethacrylate (the polymer matrix) and 250 mg polyethylene oxide (the complexing agent) in 200 ml of dichloroethane (a solvent). The solution is then stirred until a uniformly clear slurry is obtained. The dispersion is then solution cast or deposited onto a substrate containing a thin film of Cu-TCNQ switching material. The polymer matrix dispersed, which is interspersed with excess neutral TCNQ molecules forms a transparent flexible film over the switching material. The solvent (dichloroethane) is evaporated from the polymeric dispersion to form a solid film.

A variety of matrix polymers can be used including, but not limited to:
Polycarbonates
Polymethylmethacrylate (PMMA)

Polyacrylonitrile
Polyvinylacetal
Poly(methyl-2-cyanoacrylate)
Poly(4,4′isopropylidine-diphenylcarbonate)(Lexan)
Polystyrene
Poly(pyromellitimide)(Kaptan)
Poly(vinylfluoride)
Ethylcellulose
Poly(ethylacrylate)
Poly(methylacrylate)
and mixtures of the above A variety of complexing or chelating agents can be used including, but not limited to:
Acetylacetone and its derivatives
Polyethylene oxide (Carbowax)
Polypropylene glycol
Polymeric quanternary ammonium salts
Crown ethers
Poly(butyleneglycol)
Poly(epichlorohydrin)
Ethylenediaminetetraacetic acid (EDTA)
Nitrilotriacetic acid (NTA)
Dimethyglyoxime (DMG)

The organic charge transfer salt can be complexed from the non-limiting family of acceptor and donor materials discussed earlier in this specification; and, molecules of the acceptor or donor (of the type complex to form the organic salt) can be interspersed in the matrix polymer.

SINGLE ENHANCED LAYER SWITCHING MATERIAL

Figure 3:
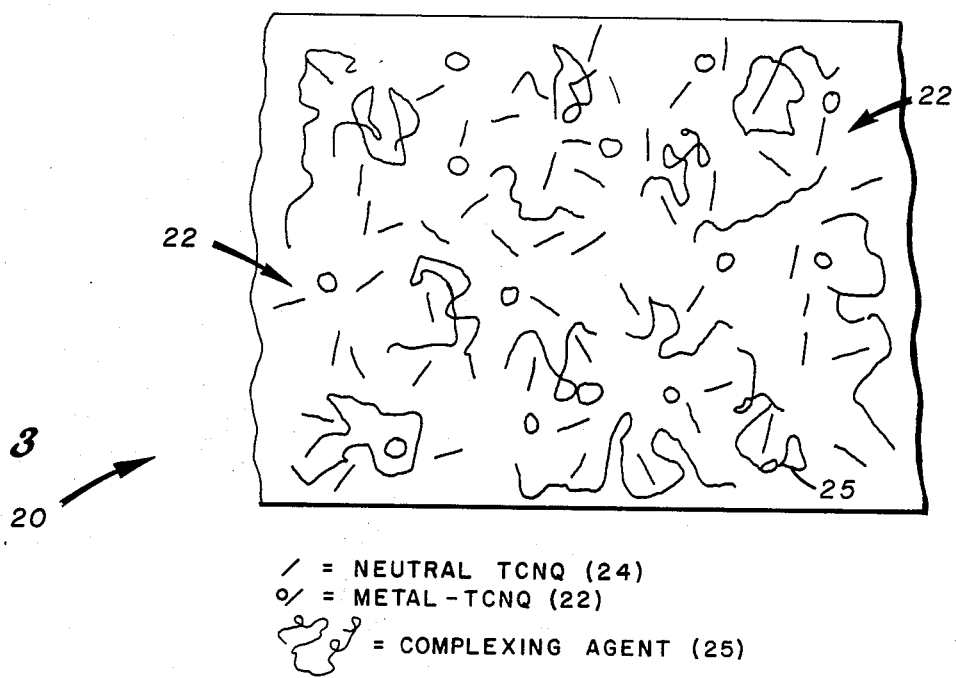
FIG. 3 is a generalized schematic of the single enhanced layer switching dispersion as taught by the present invention.

A second embodiment of the invention, shown in FIG. 3, involves mixing both the organic charge transfer salt (as a powder or microcrystals) with additional neutral acceptor molecules (the same type of acceptor molecules used to complex the organic salt), and with a matrix polymer to form a single polymer dispersion. The polymer dispersion 20 forms a single layer which is interspersed with both the switching material (the organic charge transfer salt) and the enhancing material 24 (neutral acceptor molecules). A thin film of the polymer dispersion can be coated onto a supporting base or the polymer dispersion can be molded into the appropriate form (i.e., discs, records, etc.) with the polymer dispersion acting as a self-supporting base material. With the polymer dispersion acting to form a self-supporting base material, the need to use complicated vacuum techniques to produce the optical recording medium can be eliminated.

Erasure characteristics are enhanced by the availability of a second source of neutral acceptor molecules interspersed within the matrix polymer in close proximity to donor atoms generated locally by the optically induced electrochemical switching reaction. Thermal energy reverses the reaction allowing the additional neutral acceptor molecules or acceptor molecules previously combined in the organic salt to recombine with donor atoms or molecules into a lower energy state.

The erasure characteristics can be further enhanced if a complexing or chelating agent 25 is also interspersed within the polymer dispersion. To prepare this version, the switching material (powder or microcrystals of the organic charge transfer salt), the enhancing material (neutral molecules of the organic acceptor) and the complexing agent are mixed with the polymeric matrix to form a single polymer dispersion. The polymer dispersion is then coated on a substrate or molded to form the optical recording disc, record, etc. The complexing agent enhances the homogeneity of the dispersion by reducing the microcrystalization of neutral acceptor molecules. The complexing agent also helps to solubilize the ion-radical salt to increase its compatibility with the neutral acceptor molecules. Both of these factors increase the thermal erasure characteristics of the material.

Other versions of the single polymer dispersion embodiment are also envisioned. Instead of interspersing neutral acceptor molecules in the polymer dispersion as the enhancing material, neutral donor atoms or molecules can be interspersed. Alternatively, the polymer dispersion can be interspersed or mixed with neutral molecules of both donor and acceptor moieties. Furthermore, the polymer matrix should be capable of passing optical energy. Applicants prefer to use a transparent thermally stable polymer matrix.

The process of coating a base substrate with the polymer dispersion can involve spin casting, brushing, spraying or dry coating. Alternatively, the polymer dispersion can be molded (by injection molding or other techniques) into a thin layer. The thin layer is then pressed onto the substrate. Further, to aid the coating process, the polymer dispersion can also contain a solvent; after the dispersion is coated onto the substrate the solvent is evaporated.

If a simply constructed non-erasable disc is desired, one can mix a powder or microcrystals of the organic transfer salt into a polymer matrix to form a switching dispersion. The switching dispersion can be coated onto a base substrate or separately molded with the dispersion forming a self-supporting substrate.

One example of the single enhanced layer switching material is given by way of explanation and is not meant to limit this invention. Approximately 500 mg of CuTCNQ powder is mixed into a slurry containing 50 mg of neutral TCNQ, 500 mg polymethylmetacrylate and 250 mg polyethylene oxide in 200 ml of dichloroethane. The solution is then stirred until a uniformly clear slurry is obtained. The composition is then (1) cast or (2) deposited onto smooth substrate material. The polymer matrix containing neutral TCNQ and the CuTCNQ salt forms a transparent flexible film once the solvent has evaporated from the polymeric composition.

Generally a wide variety of matrix polymers and complexing agents can be used with the present invention. In specific, the matrix polymers and complexing agents listed with the multiple layer enhancement embodiment can work equally well with this embodiment. Similarly the organic charge transfer salt used with this embodiment can be complexed from the non-limiting family of acceptor and donor materials discussed earlier in this specification; and, molecules of the acceptor or donor (of the type complexed to form the organic salt) can be interspersed in the matrix polymer.

Figure 4:
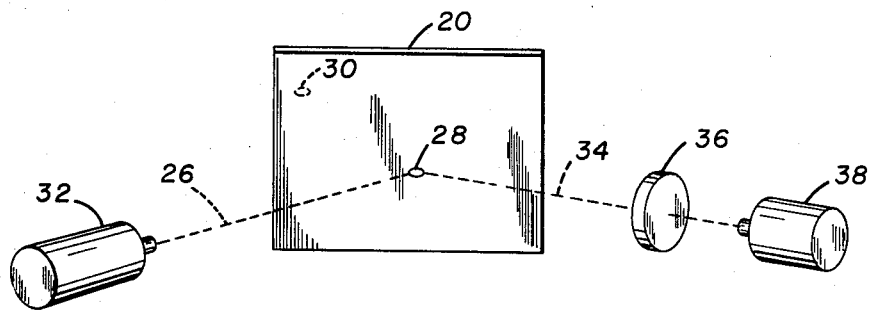
FIG. 4 is a generalized schematic of an apparatus used to read/write/erase the enhanced switching material.

FIG. 4 is a schematic diagram of the optical storage system using either embodiment of the enhanced optically sensitive material. An optical write beam 26 is focused onto a specific location on the surface of the organic charge transfer film 20. The optical beam can be a high intensity light source or a laser source such as an Argon, $CO_2$, or solid state laser focused to generate an optical field on the film surface. For memory system, an optical beam with sufficient intensity can be directed by a well known optical means to other locations on the surface of the organic charge transfer salt 20, and can switch such other locations from the first to second state. By turning the beam "ON" or "OFF" at a specific location a "1" or "0" logic state can be stored in the optical storage medium. Alternatively, if a higher optical intensity or longer duration is used, the optical beam 26 can be directed by well known optical means to "draw" a visible pattern on the organic charge transfer salt surface 20.

Once the data has been stored on the enhanced optical storage charge transfer medium, a spectroscopic means can be used to determine if a particular location on the organic film is in its first or second state. The light source 32 can also generate a lower intensity reading optical beam which is directed to illuminate one of the locations 28 with an intensity well below the switching intensity. Alternatively, a separate monochromatic or laser light source could be used. Reflected light 34 from the selected location on the film surface 28 is collected and filtered by optical filter 36 and then passed to a means for measuring the spectral intensity. The spectral measuring means 38 would indicate if the reflected beam 34 pass through filter 36 correspondent to material in the switched or unswitched states. The reading optical beam can be directed by well known optical means to each of the plurality of locations (i.e., 28, 30) on the surface of the enhanced organic charge transfer storage medium to determine if that particular location is in the first or second state, that is to say, if that particular location is storing a "1" or a "0".

A thermal erase means is used to erase the topotactic redox reaction and cause at least one of the plurality of locations on the surface of the enhanced organic charge transfer medium to return to the first or neutral state. Applicants have found that a laser, with an intensity below the switching threshold, can be focused on location 28 for a time period long enough to generate sufficient thermal energy to switch that location back to the first state. Alternatively, the optical heating beam can be generated by the same laser source 32 with an intensity below the optical switching intensity and can be directed by well known optical means to erase other locations on the organic charge transfer salt surface 20. Applicants have found that a variety of laser sources can be used to switch, read, and erase the enhanced optical storage medium.

Figure 5:
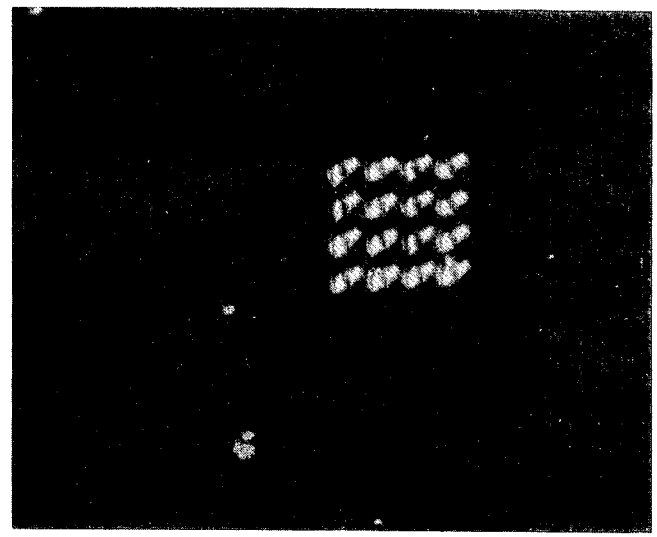
FIG. 5 is a black and white photograph showing sixteen optically switched locations on the enhanced switching material.
Figure 6:
FIG. 6 is a black and white photograph of the same film shown in FIG. 5 in which the sixteen switched locations have been optically erased.

FIG. 5 and 6 are two photographs taken in series showing this optical recording and erasure procedure. The first photograph (FIG. 5) shows sixteen high contrast spots produced on a blue/black polycrystalline CuTCNQ film overlaid with a transparent polymer matrix interspersed with excess acceptor molecules. The spots were made with an Argon Ion Laser operating at 488 nm. The second photograph (FIG. 6) shows the same region of the film after an optically generated heat source has been used to chemically recombine the copper metal with the neutral acceptor molecules. Note that in the second photograph the high contrast spots associated with the formation microscopic amounts of neutral TCNQ have disappeared.

Both embodiments of the present invention can work equally well with the bistate switching material, discussed thus far, and the multi-state optical switching material as taught in a U.S. patent application by R. S. Potember and T. O. Poehler entitled "Multistate Optical Switching and Memory Using an Amphoteric Organic Charge Transfer Material" (Ser. No. 603,717) is incorporated herein by reference. In that patent application the organic switching film can be composed of a plurality of bi-state organic switching salts (which may be linked by a chemical chain) or composed of a single amphoteric organic charge transfer complex. With either multi-state switching film there exists a plurality of acceptor and donor moieties. The enhancement mechanism as taught by the present invention can work with such multi-state switching film by having a secondary source of species of one or more moiety in either a neutral or altered oxidation state interspersed in the polymer dispersion. The acceptor or donor moiety may itself exist as a separate molecule or may be chemically attached to another material. Procedures for fabricating the polymer dispersion would be the same as taught in this specification. For the multiple layer embodiment, the covering layer would have species of at least one moiety in the neutral or altered oxidation state (with the optional complexing agent) interspersed in the matrix polymer. For the single enhanced layer embodiment the polymer dispersion would include a polymer matrix interspersed with microcrystals (or powdered microcrystals) of the multi-state switching material and also interspersed with species of one or more moieties in the neutral or altered oxidation state. For a multistate nonerasable disc, a switching dispersion can be made from at least two organic charge transfer salts interspersed in a polymer matrix. The switching dispersion can be coated onto a base substrate or separately molded with the switching dispersion forming a self-supporting substrate.

Obviously many modifications and variations of the present invention are possible in light of the above teachings. It is therefore to be understood that within the scope of the appended claims the invention may be practiced otherwise than as specifically described.

What is claimed is:

1. An optically sensitive medium comprising:
  an organic charge transfer complex having molecules of at least one organic charge transfer material, said at least one organic charge transfer material adapted to switch between at least two states having discernibly different optical characteristics in response to optical energy, and said at least one organic charge transfer material having at least one moiety; and,
  a layer interspersed with a species of said at least one moiety, and covering at least a portion of said organic charge transfer complex for enhancing erasability of said organic charge transfer complex.

2. The medium of claim 1, wherein said layer is a polymer dispersion, and said polymer dispersion is further interspersed with a complexing agent.

3. The medium of claim 1, wherein said complex contains molecules of a single organic charge transfer salt composed of a donor moiety and an organic electron acceptor moiety, and wherein said species of said at least one moiety interspersed in said layer is an oxidized species of said organic electron acceptor moiety.

4. The medium of claim 1, wherein said complex contains molecules of a single organic charge transfer salt composed of a donor moiety and an organic electron acceptor moiety, and wherein said species of said at least one moiety interspersed in said layer is a reduced species of said donor moiety.

5. The medium of claim 1, wherein said complex contains molecules of at least two organic charge transfer salts.

6. The medium of claim 1, wherein said complex contains molecules of at least one amphoteric charge transfer material having more than one redox state.

7. An optically senstive medium comprising:
a film of an organic charge transfer salt, said organic charge transfer salt adapted to switch between a first and second state, each state having discernably different optical characteristics, said organic charge transfer salt formed from a donor complexed with an acceptor; and,
a covering layer having a dispersion interspersed with neutral molecules of said acceptor, and covering at least a portion of said film for enhancing erasability of said film.

8. The medium of claim 7, wherein said dispersion is a polymer matrix interspersed with neutral molecules of said acceptor.

9. The medium of claim 8, wherein said polymer matrix is at least partially transparent to optical energy.

10. The medium of claim 7, wherein said dispersion is further interspersed with a complexing agent.

11. The medium of claim 10, wherein said dispersion is a polymer matrix interspersed with neutral molecules of said acceptor and molecules of said complexing agent.

12. The medium of claim 11, wherein said polymer matrix is at least partially transparent to optical energy.

13. The medium of claim 10, further including a supporting substrate and wherein said optically sensitive medium is a wafer comprising a base layer of said supporting substrate, a center layer of said film of an organic charge transfer salt, and an upper layer of said dispersion interspersed with neutral molecules of said acceptor and said complexing agent.

14. The medium of claim 13, wherein said wafer forms a disc.

15. The medium of claim 7, wherein said dispersion is further interspersed with neutral species of said donor.

16. The medium of claim 15, wherein said dispersion is a polymer matrix interspersed with neutral molecules of said acceptor, neutral species of said donor and molecules of a complexing agent.

17. An optically sensitive medium comprising:
an organic charge transfer material, said organic charge transfer material formed from a donor and an organic acceptor as a first state and adapted to switch from the first to a second state in response to optical energy thereby forming a first source of neutral species of the donor and organic acceptor as the second state, each state having different optical characteristics, and also adapted to switch from the second state to the first state in response to thermal energy thereby forming the organic transfer; and
a layer covering said charge transfer material to provide a second source of at least one neutral species of donor and organic acceptor.

18. An optically sensitive medium comprising:
a polymer matrix;
at least one organic charge transfer material dispersed in said matrix, said organic charge transfer material formed from at least one donor and at least one organic acceptor adapted to switch between at least 2 states in response to optical energy thereby forming a first source of at least a different species of each of the donor and the organic acceptor, each state having different optical characteristics; and,
a second source of at least one of the different species of donor dispersed in said matrix.

19. The medium of claim 18, wherein said matrix is interspersed with a complexing agent.

20. The medium of claim 18, wherein said at least one organic charge transfer material is a single organic charge transfer salt.

21. The medium of claim 18, wherein said at least one organic charge transfer material is a single organic charge transfer salt and wherein said second source is a reduced species of said donor.

22. The medium of claim 18, wherein said at least one organic charge transfer material comprises at least two organic charge transfer salts.

23. The medium of claim 18, wherein said at least one organic transfer material comprises at least one amphoteric charge transfer material having more than one redox state.

24. An optically sensitive medium comprising:
a polymer matrix;
particulates of an organic charge transfer salt dispersed in said matrix, said organic charge transfer salt formed from a donor and an organic acceptor as a first state and adapted to switch from the first to a second state in response to optical energy thereby forming a first source of neutral species of the donor and organic acceptor as the second state, each state having different optical characteristics, and also adapted to switch from the second state to the first state in response to thermal energy thereby forming the organic charge transfer salt; and
a second source of at least one neutral species of the donor dispersed in said matrix.

25. The medium of claim 24, wherein said polymer matrix is interspersed with a complexing agent.

26. The medium of claim 24, wherein said polymer matrix having particulates of said organic charge transfer salt is interspersed with neutral molecules of said acceptor and particulates of said donor from said second source and molecules of a complexing agent.

27. The medium of claim 24 or 26, wherein said particulates of said organic charge transfer salt are microcrystals.

28. The medium of claims 8 or 24, wherein said polymer matrix is selected from the group consiting of:
Polycarbonates
Polymethylmethacrylate (PMMA)
Polyacrylonitrile
Polyvinylacetal
Poly(methyl-2-cyanocrylate)
Poly(4,4'isopropylidine-diphenylcarbonate) (Lexan)
Polystyrene
Poly(pyromellitimide) (Kaptan)
Poly(vinylfluoride)
Ethylcellulose
Poly(ethylacrylate)
Poly(methylacrylate).

29. The medium of claims 10, 13 or 25, wherein said complexing agent is selected from the group consisting of:
Acetylacetone and its derivatives
Polyethylene oxide (Carbowax)
Polypropylene glycol
Polymeric quanternary ammonium salts
Crown ethers
Poly(butyleneglycol)
Poly(epichlorohydrin)
Ethylenediaminetetraacetic acid (EDTA)

Nitrilotriacetic acid (NTA)
Dimethyglyoxime (DMG)

30. An optically sensitive medium comprising:
a polymer matrix;
at least one organic charge transfer material dispersed in said matrix, said organic charge transfer material formed from at least one donor and at least one organic acceptor as a first state and switching from the first state to a second state in response to optical energy thereby forming a first source of at least a different species of each of the donor and the organic acceptor, each state having different optical characteristics and switching from the second state to the first state in response to thermal energy;
a second source of at least one of the different species of organic acceptor dispersed in said matrix; and,
wherein said at least one donor is only provided by the charge transfer material.

31. An optically sensitive medium comprising:
a polymer matrix;
particulates of an organic charge transfer salt dispersed in said matrix, said organic charge transfer salt formed from a donor and an organic acceptor as a first state and switching from the first to a second state in response to optical energy thereby forming a first source of neutral species of the donor and organic acceptor as the second state, each state having different optical characteristics, and also switching from the second state to the first state in response to thermal energy thereby forming the organic charge transfer salt;
a second source of at least one neutral species of the organic acceptor dispersed in said matrix; and, wherein said at least one donor is only provided by the charge transfer material.

32. The medium of claims 18, 24, 17, 30 or 31, wherein the matrix is at least partially transparent to optical energy.

33. The medium of claims 18, 24, 17, 30 or 31, wherein the donor is an organic donor.

34. The medium of claims 18, 24, 17, 30 or 31, wherein the donor is at least one of tetrathioethylenes, dithiodiaminoethylenes, dithiodiselenoethylenes.

35. The medium of claims 18, 24, 17, 30 or 31, wherein the donor is at least one of copper, silver, lead, nickel, lithium, sodium, potassium, barium, chromium, molybdenum, tungsten, cobalt, iron, antimony, cesium and magnesium.

36. The medium of claims 18, 24, 17, 30 or 31, wherein the acceptor contains at least one cyanomethylene functional group.

37. The medium of claims 18, 24, 17, 30 or 31, wherein the acceptor is at least one of:

| | |
|---|---|
| TCNQ(OMe) | TCNQ IMe |
| TCNQ(OMe)$_2$ | TCNQI |
| TCNQ(OMe)(OEt) | TCNQ(OMe)(OCH$_3$)$_2$ |
| TCNQ(OMe)(O—i-Pr) | (TCNQ(CN))$_2$ |
| TCNQ(OMe)(O—i-Bu) | (TCNQ(Me) |
| TCNQ(O—i-C$_2$H$_5$) | TCNQ(Et) |
| TCNQ(OEt)(SMe) | TCNQ(i-Pr) |
| TCNQ Cl | TCNQ(i-Pr)$_2$ |
| TCNQ Br | TCNQ(i-Pr) |
| TCNQ ClMe | TCNQ(i-Pr)$_2$ |
| TCNQ Br Me | |

* * * * *